US012136382B1

(12) United States Patent
Wu

(10) Patent No.: US 12,136,382 B1
(45) Date of Patent: Nov. 5, 2024

(54) METHOD OF CONTROLLING DRIVING CIRCUIT OF LED DISPLAY DEVICE AND RELATED TIMING CONTROLLER AND LED DISPLAY DEVICE THEREOF

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/136,317

(22) Filed: Apr. 18, 2023

(51) Int. Cl.
*G09G 3/20* (2006.01)
*G09G 3/32* (2016.01)

(52) U.S. Cl.
CPC ......... *G09G 3/32* (2013.01); *G09G 2310/027* (2013.01); *G09G 2310/08* (2013.01); *G09G 2320/0633* (2013.01); *G09G 2330/028* (2013.01); *G09G 2340/10* (2013.01)

(58) Field of Classification Search
CPC ............... G09G 3/32; G09G 2310/027; G09G 2310/08; G09G 2320/0633; G09G 2330/028; G09G 2340/10
See application file for complete search history.

(56) References Cited

U.S. PATENT DOCUMENTS 9,551,913 B2 * 1/2017 Kim ........................ G02F 1/172
10,170,035 B2 * 1/2019 Park ..................... G09G 3/3208
10,319,309 B2 * 6/2019 Kim ..................... G09G 3/2088
10,388,254 B2 * 8/2019 Lee ........................ G09G 3/006
10,497,332 B2 * 12/2019 Yamagishi ........... G09G 3/3685
10,522,081 B2 * 12/2019 Kim ..................... G09G 3/2092
2008/0007494 A1 * 1/2008 Kim ..................... G09G 3/3225 345/77
2015/0097872 A1 * 4/2015 Jeong ................... G09G 3/3225 345/77
2015/0154913 A1 * 6/2015 Kim ..................... G09G 3/3258 345/691
2015/0187321 A1 * 7/2015 Kim ..................... G09G 3/3666 345/87
2015/0348492 A1 * 12/2015 Park ..................... G09G 3/3666 345/205
2016/0133189 A1 * 5/2016 Kang .................. G09G 3/3258 345/82

(Continued)

FOREIGN PATENT DOCUMENTS

TW 202203179 A 1/2022
TW 202225792 A 7/2022

*Primary Examiner* — Jose R Soto Lopez
(74) *Attorney, Agent, or Firm* — Winston Hsu

(57) ABSTRACT

A timing controller for controlling a plurality of driving circuits of a light-emitting diode (LED) display device is provided. The timing controller comprises: a voltage level conversion circuit and a setting circuit. The voltage level conversion circuit is configured to determine a plurality of voltage level settings with respect to a plurality of image regions of an input image. The setting circuit is configured to respectively set the plurality of driving circuits of the LED display device according to the plurality of voltage level settings, wherein the third circuitry is configured to set each of the plurality of driving circuits to utilize a drive voltage at a specific level that is indicated by a corresponding one of the voltage level settings, to respectively drive LED units of the LED display device.

15 Claims, 6 Drawing Sheets

(56) References Cited

U.S. PATENT DOCUMENTS

| | | | | |
|---|---|---|---|---|
| 2016/0232852 | A1* | 8/2016 | An | G09G 3/3291 |
| 2017/0011692 | A1* | 1/2017 | Lee | G09G 3/3233 |
| 2017/0132975 | A1* | 5/2017 | Park | G09G 3/3233 |
| 2017/0329165 | A1* | 11/2017 | Li | G09G 3/3696 |
| 2018/0068637 | A1* | 3/2018 | Ninan | G09G 3/3426 |
| 2019/0073971 | A1* | 3/2019 | Bai | G09G 3/3614 |
| 2020/0388206 | A1* | 12/2020 | Bae | G09G 3/2003 |
| 2021/0158748 | A1* | 5/2021 | Kawae | G09G 3/32 |
| 2022/0059036 | A1* | 2/2022 | Sang | G09G 3/3275 |
| 2022/0084460 | A1 | 3/2022 | Shi | |
| 2022/0237913 | A1* | 7/2022 | Wyble | G06F 18/2193 |
| 2022/0328012 | A1* | 10/2022 | Lim | G09G 3/3291 |
| 2023/0206869 | A1* | 6/2023 | Li | G09G 3/36 |
| 2023/0215307 | A1* | 7/2023 | Hwang | G09G 3/006<br>345/204 |
| 2023/0377534 | A1* | 11/2023 | Sung | G09G 3/2096 |

* cited by examiner

| | | | | | | | | |
|---|---|---|---|---|---|---|---|---|
| Gray-Level | 0 | 1 | 2 | … | 64 | 65 | … | 255 |
| Luminance | 0 | 4 | 8 | … | 251 | 255 | … | 1000 |

| | | | | | |
|---|---|---|---|---|---|
| Luminance | 0~125 | 0~250 | 0~375 | … | 0~1000 |
| Voltage Level Setting | Level 1 | Level 2 | Level 3 | … | Level N |

FIG. 4

METHOD OF CONTROLLING DRIVING CIRCUIT OF LED DISPLAY DEVICE AND RELATED TIMING CONTROLLER AND LED DISPLAY DEVICE THEREOF

BACKGROUND OF THE INVENTION

1. Field of the Invention

The present invention relates to display device, and more particularly, to a method of controlling driving circuit of light-emitting diode (LED) display device and related timing controller and LED display device thereof.

2. Description of the Prior Art

With the advancement of information technologies, there is increasing demand for display devices as a medium for presenting information to a user. Recently, display devices which use light-emitting diode (LED) units as RGB pixels (i.e., sub-pixels) for displaying rather than back-lighting are widely used and developed, such as organic LED (OLED) display device or micro LED display device. Some of LED display devices rely on driving circuits to provide constant current to drive LED units and control pixel brightness by varying duty cycles. The driving circuits also apply a drive voltage to bias the LED units, thereby to allow the LED units to be operated properly. Conventionally, driving circuits use a constant voltage to drive the LED units, but this is not energy-efficient since image content may have darker regions and brighter regions. Sometimes, pixels do not need a high drive voltage to be able to properly display image content in dark regions. In view of this, there is a need of providing a method of controlling driving circuit to improve the energy efficiency of the LED display panel.

SUMMARY OF THE INVENTION

With this in mind, it is one object of the present invention to provide adaptive drive voltage control mechanism on a regional basis for LED display device. Embodiments of the present invention perform content analysis on an input image and accordingly determine a maximum luminance value with respect to each image region of the input image. Based on a maximum luminance value with respect to each image region, it can be determined a voltage level setting for driving pixels of each display region. As the present invention allows drive voltages of LED display device to be adaptively controlled on a regional basis, power consumption can be significantly reduced.

According to one embodiment of the present invention, a timing controller for controlling a plurality of driving circuits of a light-emitting diode (LED) display device is provide. The LED display device comprises: a voltage level conversion circuit and a setting circuit. The voltage level conversion circuit is configured to determine a plurality of voltage level settings with respect to a plurality of image regions of an input image, respectively. The setting circuit is configured to respectively set the plurality of driving circuits of the LED display device according to the plurality of voltage level settings, wherein the setting circuit is configured to set each of the plurality of driving circuits to utilize a drive voltage at a specific level that is indicated by a corresponding one of the voltage level settings, to respectively drive LED units of the LED display device.

According to one embodiment, a method for use in an LED display device to control a plurality of driving circuits thereof is provided. The method comprises: determining a plurality of voltage level settings with respect to a plurality of image regions of an input image, respectively; and respectively setting the plurality of driving circuits of the LED display device according to the plurality of voltage level settings, thereby to control each of the plurality of driving circuits to utilize a drive voltage at a specific level that is indicated by a corresponding one of the voltage level settings to respectively drive LED units of the LED display device.

According to one embodiment, an LED display device is provided. The LED display device comprises: a plurality of LED display blocks and a timing controller. Each of plurality of LED display blocks comprises an LED array and an LED driving circuit. The timing controller is coupled to the plurality of LED display blocks, and is configured to respectively control a plurality of LED driving circuits of the plurality of LED display blocks. The timing controller comprises: a voltage level conversion circuit configured to determine a plurality of voltage level settings with respect to a plurality of image regions of an input image, respectively; and a setting circuit configured to respectively set the plurality of driving circuits according to the plurality of voltage level settings, wherein the setting circuit is configured to set each of the plurality of driving circuits to utilize a drive voltage at a specific level that is indicated by a corresponding one of the voltage level settings, to respectively drive LED units included in each of the plurality of LED panels.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 illustrates gray-level to luminance mapping and luminance to voltage-level mapping according to one embodiment of the present invention.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
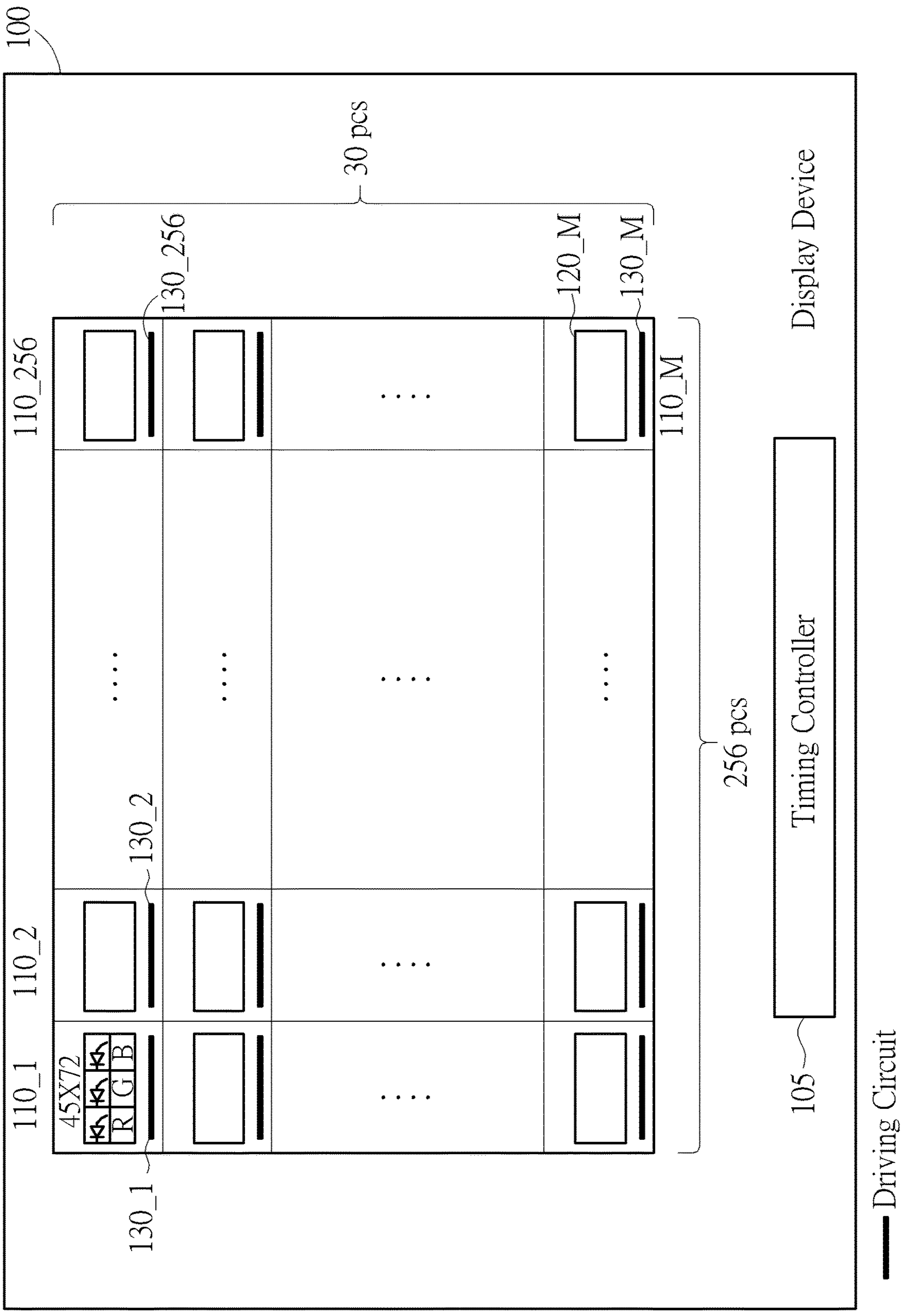
FIG. 1 illustrates a schematic diagram of a display device according to one embodiment of the present invention.

FIG. 1 illustrates a light emitting diode (LED) display device is according with one embodiment of the present invention. As illustrated, an LED display device 100 includes a timing controller 105 and a plurality of LED display blocks 110_1-110_M. In one embodiment, the LED display device could be a micro LED display device. Each of the LED display blocks 110_1-110_M further includes an LED driving circuit 130_*k* (where k=1 to M). In one embodiment, each of the LED display blocks 110_1-110_M comprises an array of LED units (which could be micro LED units), forming an array of sub-pixels (e.g. RGB sub-pixel) of the LED display device 100. Each of the LED driving circuits 130_1-130_M is a display driver integrated circuit (DDIC) and is configured to drive the array of the LED units on a corresponding one of LED display blocks 110_1-110_M. For example, the LED driving circuit 130_2 is configured to drive the LED units on the LED block 110_2. In the embodiment shown by FIG. 1, LED display device 100 has a resolution of 3840×2160 and is made up of (256×30) LED display blocks. Each of (256×30) LED display blocks further comprises 45 (H)×72 (V) LED units, thereby serve as 45 (H)×72 (V) RGB sub-pixels. Please note that, although specific numbers or values are mentioned in the descriptions, they should not be deemed as limitations of the present invention. According to various embodiment of the present invention, these numbers or values would be different to satisfy actual requirements.

Typically, each of the LED driving circuits 130_1-130_M is configured to use a drive voltage at a predetermined voltage level to apply to each of the LED units. Moreover, a brightness of the sub-pixel (i.e., an LED unit) is determined according to an average time that the LED unit is turned on (i.e., duty cycle), which is also controlled by the LED driving circuits 130_1-130_M. The drive voltages provided by the LED driving circuits 130_1-130_M allow the LED units to operate in a proper working region (e.g. saturation region).

In embodiments of the present invention, multiple drive voltage levels are selectable by each of the LED driving circuits 130_1-130_M to drive the LED units. Based on content analysis, the timing controller 105 could determine a proper voltage level setting individually for each of the LED driving circuits 130_1-130_M, thereby to allow the LED driving circuits 130_1-130_M to use different drive voltage levels to drive the LED units on a regional basis for displaying a same input image.

Specifically, the timing controller 105 receives digital input image data (e.g. RGB values regarding each pixel) of an input image that is sent by a host system (not shown). The timing controller 105 would arrange the input image data in conformity with disposition configuration of the LED display blocks 110_1-110_M as well as the LED driving circuits 130_1-130_M, thereby to supply the arranged input image data to each of the LED driving circuits 130_1-130_M. During arrangement of the input image data, the timing controller 105 could perform content analysis.

Figure 2:
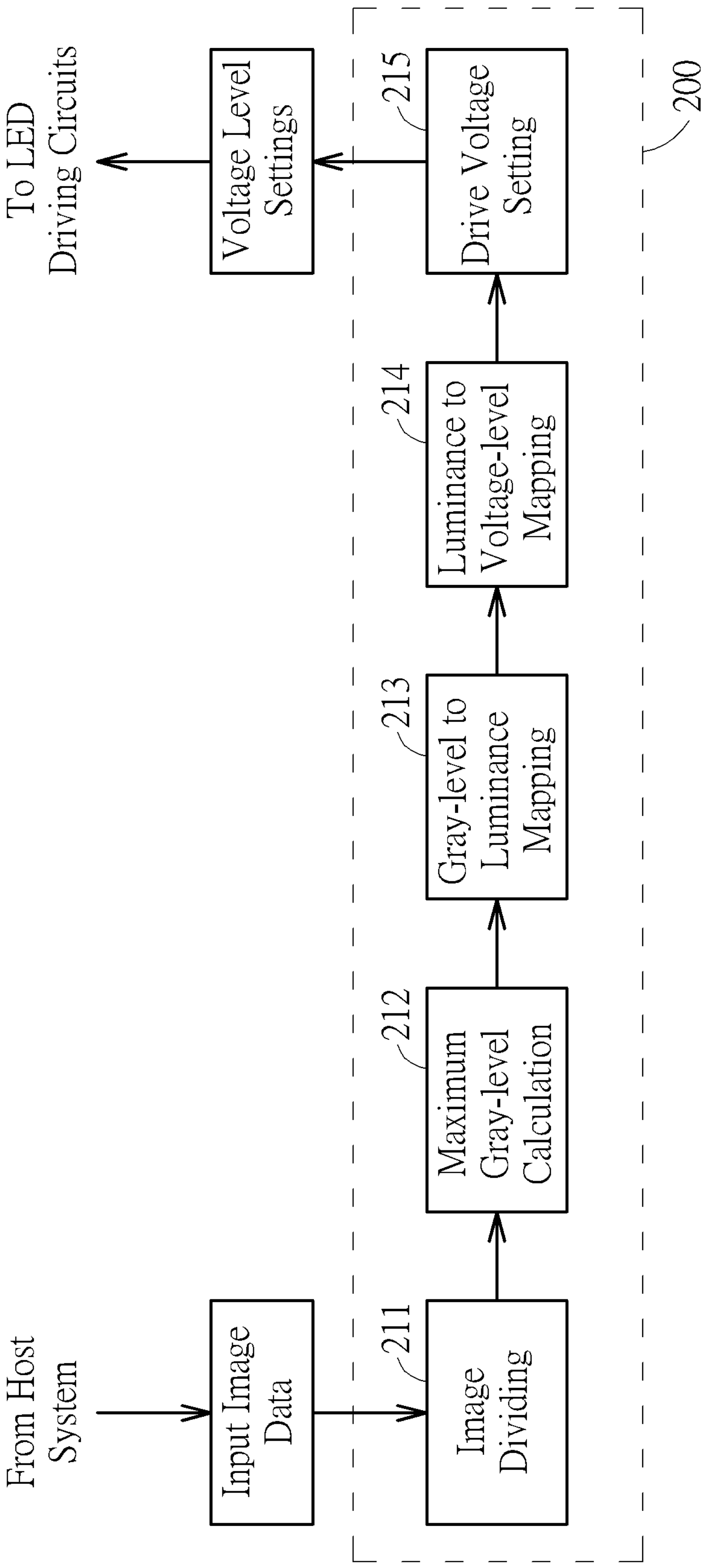
FIG. 2 illustrates a schematic diagram of an adaptive drive voltage control block of a timing controller according to one embodiment of the present invention.
Figure 3:
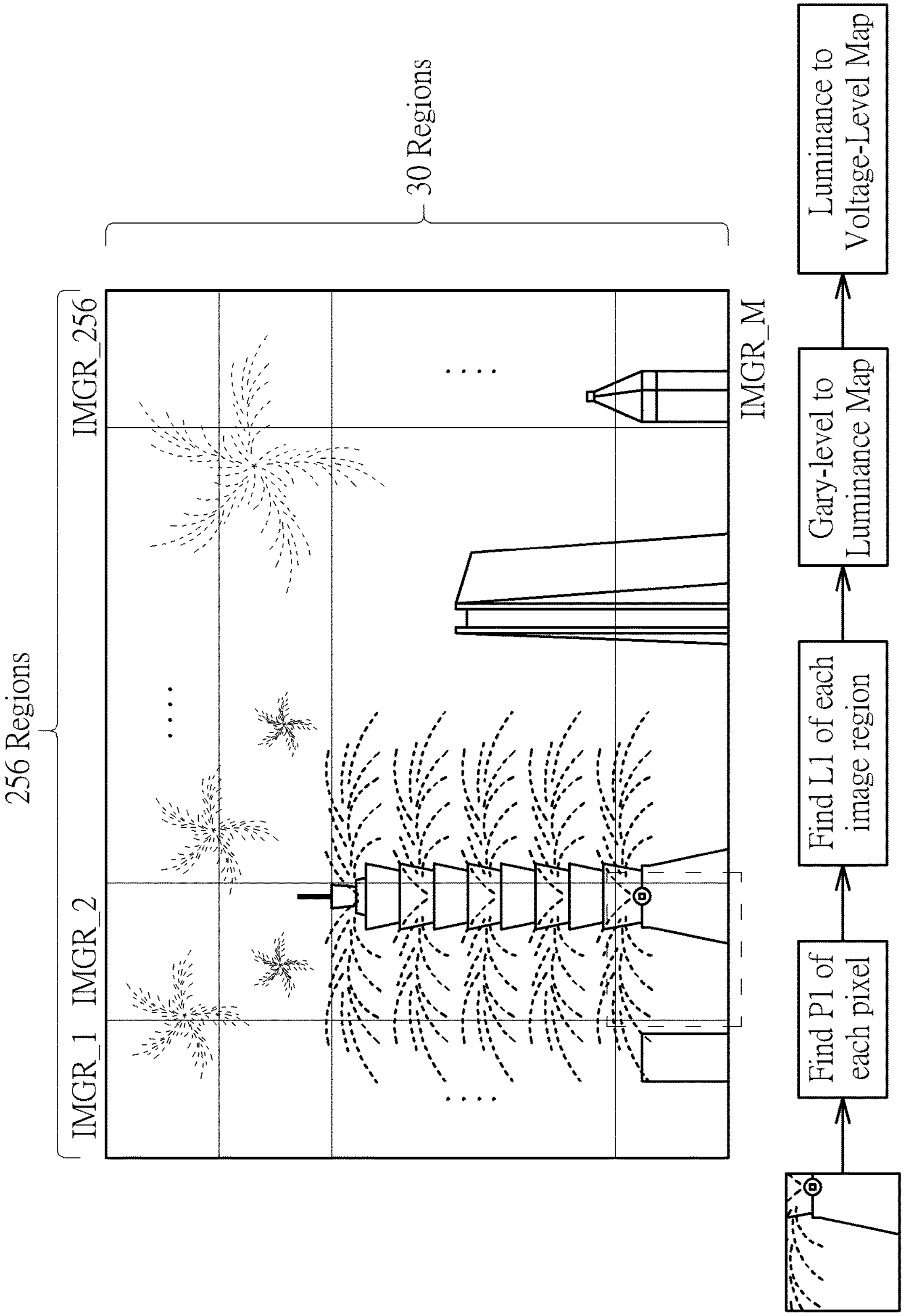
FIG. 3 illustrates how an adaptive drive voltage control block operates according to one embodiment of the present invention.

Please refer to FIG. 2 in conjunction with FIG. 3, wherein FIG. 2 illustrates functional blocks of an adaptive drive voltage control block 200 of the timing controller 105 according to one embodiment of the present invention and FIG. 3 illustrates how an adaptive drive voltage control block works according to one embodiment of the present invention. During content analysis, an image dividing block 211 is configured to divide the input image into a plurality of image regions IMGR_1-IMGR_M as shown by FIG. 3, which would be consistent with disposition configuration of the LED display blocks 110_1-110_M as well as the LED driving circuits 130_1-130_M. Accordingly, based on arranged input image data of each of image regions IMGR_1-IMGR_M, a maximum gray-level calculation block 212 is configured to determine a maximum gray-level of pixels of each image region according to the arranged input image data. Specifically, the maximum gray-level calculation block 212 would first determine a maximum sub-pixel gray level P1 of R, G and B sub-pixels with respect to each single pixel. For example, if gray levels of R, G, and B sub-pixels of a pixel is (20, 55, 80), the maximum gray-level calculation block 212 would determine "80" as the maximum sub-pixel gray level P1 of the pixel. Based on to the determined maximum sub-pixel gray levels, the maximum gray-level calculation block 212 would determine a maximum pixel gray level Li of all the pixels with respect to each image region according to the determined maximum sub-pixel gray levels. In the case shown by FIG. 1, the maximum gray-level calculation block 212 would determine (15×72) maximum sub-pixel gray levels from (15×3×72) sub-pixel gray levels and determine one maximum pixel gray level from (15×72) determined maximum sub-pixel gray levels. Finally, the maximum gray-level calculation block 212 could determine (256×30) maximum pixel gray levels for (256×30) image regions.

Accordingly, a gray-level to luminance mapping block 213 is configured to map the determined maximum pixel gray level of each image region to a maximum luminance value of each image region. In case shown by FIG. 1, the gray-level to luminance mapping block 213 could determine (256×30) maximum luminance values from (256×30) determined maximum pixel gray levels with respect to (256×30) image regions. FIG. 4 illustrates a gray-level to luminance mapping table according to one embodiment of the present invention. As illustrated, higher gray levels will be mapped to higher luminance value. Please note that this is just for illustrative purpose rather than limitations of the present invention.

A luminance to voltage-level mapping block 214 is configured to map the determined maximum luminance value of each image region to a voltage level setting of each image region. In case shown by FIG. 1, the luminance to voltage-level mapping block 214 could determine (256×30) voltage level settings for (256×30) image regions. FIG. 4 illustrates a luminance to voltage mapping table according to one embodiment of the present invention. As illustrated, higher voltage level settings could cover a wider range of luminance values. However, higher level settings would cause the LED driving units 130_1-130_M to utilize drive voltages with higher voltage level to drive LED units, which significantly increases power consumption. In view of this, the present invention actually allow the LED driving units 130_1-130_5 to use a drive voltage at a minimum voltage level that is sufficient for the LED units to emits light at a specific luminance. For example, if the maximum luminance value of a certain image region is 200, the luminance to voltage-level mapping block 214 only selects the voltage setting Level 2 to configure the LED driving circuit even though voltage settings Level 3-Level N are also able to achieve the maximum luminance value of 200.

Based the voltage level settings obtained by the luminance to voltage-level mapping block 214, a drive voltage setting block 215 accordingly configures each of the LED driving circuits 130_1-130_M to set the drive voltage at a specific voltage level indicated by a corresponding voltage level setting. In one embodiment, each of the LED driving circuits 130_1-130_M could comprises a voltage converter, such a LDO converter, to convert voltage at high level to the drive voltage at the voltage level indicated by the voltage level setting. In another embodiment, the LED display device 100 could comprise a power management IC (PMIC, not shown), which provide multiple voltages at different levels to each of the LED driving circuits 130_1-130_M. According to the voltage level setting provided by the drive voltage setting block 215, the LED driving circuits 130_1-130_M could select a proper one of the voltage levels to drive the LED units.

Figure 5:
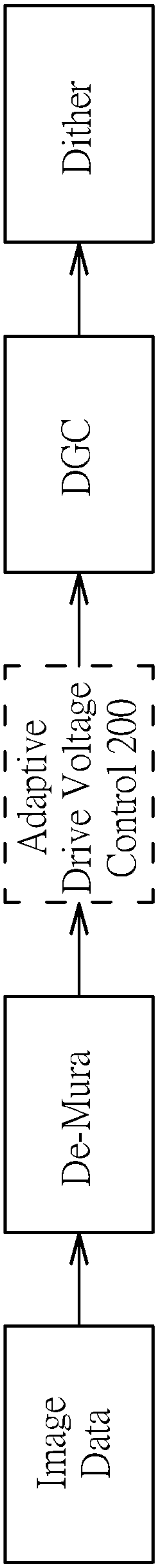
FIG. 5 illustrates processing procedures in a timing controller according to one embodiment of the present invention

In view of this, as the adaptive drive voltage control block 200 perform content analysis, it achieves drive voltage control on a regional basis, which allows the LED driving circuit 130_1-130_N to use drive voltages at different voltage levels to drive corresponding LED units in displaying a same input image. Moreover, in one embodiment, an adaptive drive voltage control process of the adaptive drive voltage control block 200 will be performed in conjunction with other processing procedures that are typically performed by a timing controller. Please refer to FIG. 5, which illustrates processing procedures in a timing controller according to one embodiment of the present invention. At first, image data of an image to be displayed will be provided to a de-mura process (which may be performed by a specific circuit), wherein the de-mura process is utilized to correct non-uniformities in the LED display device 100, such as color and brightness inconsistencies, by adjusting brightness, color, and/or position of pixels. After the de-mura process, processed image data will be inputted to the adaptive drive voltage control block 200 to determine a voltage level setting for each LED driving circuit. Accordingly, image data will be provided to a digital gamma correction (DGC) process (which may be performed by a specific circuit). The DGC process is responsible for adjusting brightness and contrast levels of the LED display device 100 to match intended gamma curve by correcting the brightness value of each pixel. Then, the image data processed by the DGC process will be provided to a dither process (which may be performed by a specific circuit). The dither process is utilized to reduce color banding and gradient artifacts caused by limited color depth of the LED display device 100.

Figure 6:
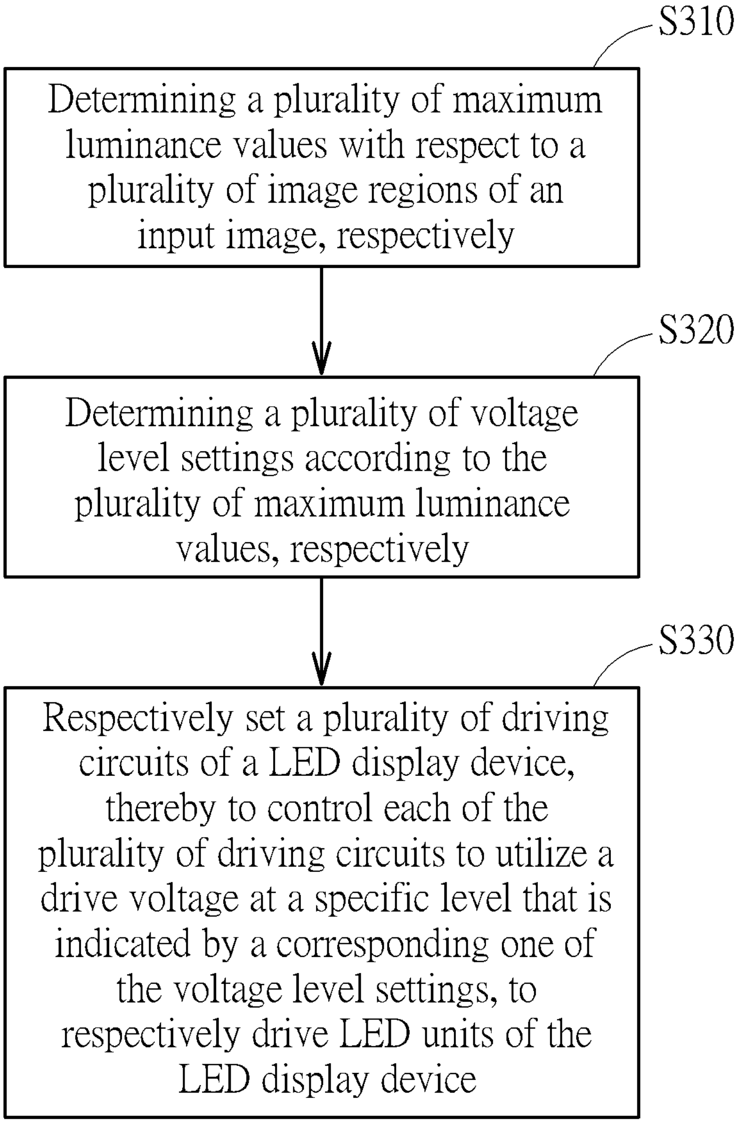
FIG. 6 illustrates a flow chart of a method of controlling driving circuits of a display device according to one embodiment of the present invention.

FIG. 6 illustrates a flow chart of a method of controlling driving circuits of an LED display device according to one embodiment. As shown in the figure, the method of the present invention includes the following simplified flow:

Step S310: determining a plurality of maximum luminance values with respect to a plurality of image regions of an input image, respectively;

Step S320: determining a plurality of voltage level settings according to the plurality of maximum luminance values, respectively; and Step S330: respectively set a plurality of driving circuits of the LED display device, thereby to control each of the plurality of driving circuits to utilize a drive voltage at a specific level that is indicated by a corresponding one of the voltage level settings to respectively drive LED units of the LED display device Since principles and specific details of the foregoing steps have been explained in detail through the above embodiments, further descriptions will not be repeated here. It should be noted that the above flow may be possible, by adding other extra steps or making appropriate modifications and adjustments, to better improve power efficiency of the LED display device.

In conclusion, the method and the timing controller by the present invention can effectively reduce the power consumption without degrading image quality of LED display devices. It is significant to mobile devices as such devices have limited batter power.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a “module” or “system.” Furthermore, the present embodiments may take the form of a computer program product embodied in any tangible medium of expression having computer-usable program code embodied in the medium.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a “module” or “system.” Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A timing controller for controlling a plurality of driving circuits of a light-emitting diode (LED) display device, comprising:

a voltage level conversion circuit configured to determine a plurality of voltage level settings with respect to a plurality of image regions of an input image, respectively, comprising:

a first circuitry configured to determine a plurality of maximum luminance values with respect to the plurality of image regions of the input image, respectively, wherein each of the maximum luminance values is a regional maximum luminance value and corresponds to a specific one of the image regions of the input image; and a second circuitry configured to determine the plurality of voltage level settings according to the plurality of maximum luminance values, respectively, wherein the second circuitry is configure to determine the plurality of voltage level settings according to the plurality of maximum luminance values before a digital gamma correction process is performed with respect to the input image: each of the voltage level settings corresponds to a predetermined luminance range and a predetermined driving voltage level: when determining a voltage level setting for an image region, the second circuitry is configured to select the voltage level setting corresponding to a lowest driving voltage level whose predetermined luminance range is sufficient to cover a regional maximum luminance value of the image region; and a setting circuit configured to respectively set the plurality of driving circuits of the LED display device according to the plurality of voltage level settings, wherein the setting circuit is configured to set each of the plurality of driving circuits to utilize a drive voltage at a specific level that is indicated by a corresponding one of the voltage level settings, to respectively drive LED units of the LED display device.

2. The timing controller of claim 1, wherein the first circuitry comprises:

an image dividing circuit, configured to divide the input image into the plurality of image regions and arrange image data of the input image according to arrangement of the image regions; and a maximum gray-level calculation circuit, coupled to the image dividing circuit, configured to determine a maximum pixel gray level with respect to each image region based on arranged image data of each image region.

3. The timing controller of claim 2, wherein the second circuitry comprises:

a gray-level to luminance mapping circuit, coupled to the maximum gray-level calculation circuit, configured to map the maximum pixel gray level with respect to each image region to a maximum luminance value with respect to each image region; and a luminance to voltage mapping circuit, coupled to the gray-level to luminance mapping circuit, configured to map the maximum luminance value with respect to each image region to a voltage level setting with respect to each image region.

4. The timing controller of claim 3, wherein the setting circuit comprises:

a drive voltage setting circuit, coupled to the luminance to voltage mapping circuit, configured to control the plurality of the driving circuits based on a plurality of voltage level settings, thereby to configure each of the plurality of driving circuits to utilize the drive voltage at the specific level that is indicated by the corresponding one of the voltage level settings.

5. The timing controller of claim 1, wherein the LED display device is a micro LED display device, and the LED units are micro LED units.

6. A method for use in a light-emitting diode (LED) display device to control a plurality of driving circuits thereof, the method comprising:

determining a plurality of voltage level settings with respect to a plurality of image regions of an input image, respectively, comprising:

determining a plurality of maximum luminance values with respect to the plurality of image regions of the input image, respectively, wherein each of the maximum luminance values is a regional maximum luminance value and corresponds to a specific one of the image regions of the input image; and determining the plurality of voltage level settings according to the plurality of maximum luminance values, respectively, wherein the plurality of voltage level settings are determined according to the plurality of maximum luminance values before a digital gamma correction process is performed with respect to the input image; and each of the voltage level settings corresponds to a predetermined luminance range and a predetermined driving voltage level, and the step of determining a voltage level setting for an image region comprises:

selecting the voltage level setting corresponding to a lowest driving voltage level whose predetermined luminance range is sufficient to cover a regional maximum luminance value of the image region; and respectively setting the plurality of driving circuits of the LED display device according to the plurality of voltage level settings, thereby to control each of the plurality of driving circuits to utilize a drive voltage at a specific level that is indicated by a corresponding one of the voltage level settings to respectively drive LED units of the LED display device.

7. The method of claim 6, wherein the step of determining the plurality of maximum luminance values comprises:

dividing the input image into the plurality of image regions and arrange image data of the input image according to arrangement of the image regions; and determining a maximum pixel gray level with respect to each image region based on arranged image data of each image region.

8. The method of claim 7, wherein step of determining the plurality of voltage level settings comprises:

mapping the maximum pixel gray level with respect to each image region to a maximum luminance value with respect to each image region; and mapping the maximum luminance value with respect to each image region to a voltage level setting with respect to each image region.

9. The method of claim 8, wherein the step of respectively setting the plurality of driving circuits comprises:

controlling the plurality of the driving circuits based on the plurality of voltage level settings, thereby to configure each of the plurality of driving circuits to utilize the drive voltage at the specific level that is indicated by the corresponding one of the voltage level settings.

10. The method of claim 6, wherein the LED display device is a micro LED display device, and the LED units are micro LED units.

11. A light-emitting diode (LED) display device, comprising:

a plurality of LED display blocks, each comprising an LED array and an LED driving circuit;

a timing controller, coupled to the plurality of LED display blocks, configured to respectively control a plurality of LED driving circuits of the plurality of LED display blocks, comprising:

a voltage level conversion circuit configured to determine a plurality of voltage level settings with respect to a plurality of image regions of an input image, respectively, comprising:

a first circuitry configured to determine a plurality of maximum luminance values with respect to the plurality of image regions of the input image, respectively, wherein each of the maximum luminance values is a regional maximum luminance value and corresponds to a specific one of the image regions of the input image; and a second circuitry configured to determine the plurality of voltage level settings according to the plurality of maximum luminance values, respectively, wherein the second circuitry is configured to determine the plurality of voltage level settings according to the plurality of maximum luminance values before a digital gamma correction process is performed with respect to the input image; each of the voltage level settings corresponds to a predetermined luminance range and a predetermined driving voltage level; when determining a voltage level setting for an image region, the second circuitry is configured to select the voltage level setting corresponding to a lowest driving voltage level whose predetermined luminance range is sufficient to cover a regional maximum luminance value of the image region; and a setting circuit configured to respectively set the plurality of driving circuits according to the plurality of voltage level settings, wherein the setting circuit is configured to set each of the plurality of driving circuits to utilize a drive voltage at a specific level that is indicated by a corresponding one of the voltage level settings, to respectively drive LED units included in each of the plurality of LED panels.

12. The LED display device of claim 11, wherein the first circuitry comprises:

an image dividing circuit, configured to divide the input image into the plurality of image regions and arrange image data of the input image according to arrangement of the image regions; and a maximum gray-level calculation circuit, coupled to the image dividing circuit, configured to determine a maximum pixel gray level with respect to each image region based on arranged image data of each image region.

13. The LED display device of claim 12, wherein the second circuitry comprises:

a gray-level to luminance mapping circuit, coupled to the maximum gray-level calculation circuit, configured to map the maximum pixel gray level with respect to each image region to a maximum luminance value with respect to each image region; and a luminance to voltage mapping circuit, coupled to the gray-level to luminance mapping circuit, configured to map the maximum luminance value with respect to each image region to a voltage level setting with respect to each image region.

14. The LED display device of claim 13, wherein the setting circuit comprises:

a drive voltage setting circuit, coupled to the luminance to voltage mapping circuit, configured to control the plurality of the driving circuits based on a plurality of voltage level settings, thereby to configure each of the plurality of driving circuits to utilize the drive voltage at the specific level that is indicated by the corresponding one of the voltage level settings.

15. The LED display device of claim 11, wherein the LED display device is a micro LED display device, and the LED units are micro LED units.

* * * * *